United States Patent
Elias et al.

(10) Patent No.: US 12,025,525 B2
(45) Date of Patent: Jul. 2, 2024

(54) TACTILE SENSOR

(71) Applicant: The Shadow Robot Company Limited, London (GB)

(72) Inventors: Hugo Elias, London (GB); Matthew Godden, London (GB)

(73) Assignee: THE SHADOW ROBOT COMPANY LIMITED, London (GB)

( * ) Notice: Subject to any disclaimer, the term of this patent is extended or adjusted under 35 U.S.C. 154(b) by 305 days.

(21) Appl. No.: 17/595,662

(22) PCT Filed: May 29, 2020

(86) PCT No.: PCT/GB2020/051309
§ 371 (c)(1),
(2) Date: Nov. 22, 2021

(87) PCT Pub. No.: WO2020/240202
PCT Pub. Date: Dec. 3, 2020

(65) Prior Publication Data
US 2022/0221357 A1      Jul. 14, 2022

(30) Foreign Application Priority Data
May 31, 2019   (GB) ..................... 1907744

(51) Int. Cl.
*G01L 5/22*     (2006.01)
*B25J 13/08*    (2006.01)
*G01L 5/166*    (2020.01)
(52) U.S. Cl.
CPC ............. *G01L 5/228* (2013.01); *B25J 13/084* (2013.01); *G01L 5/166* (2013.01)

(58) Field of Classification Search
CPC ......... G01L 5/226; G01L 5/228; B25J 13/084
See application file for complete search history.

(56) References Cited

U.S. PATENT DOCUMENTS

| 8,411,140 | B2 * | 4/2013 | Adelson | ................. G06V 40/12 |
| | | | | 348/135 |
| 10,562,190 | B1 * | 2/2020 | Lee | ......................... G01L 5/226 |
| 2008/0284925 | A1 | 11/2008 | Han | |
| 2009/0315989 | A1 | 12/2009 | Adelson | |
| 2012/0240691 | A1 | 9/2012 | Wettels | |

OTHER PUBLICATIONS

International Search Report from International Patent Application No. PCT/GB2020/051309 mailed Aug. 4, 2020, 1 page.

* cited by examiner

*Primary Examiner* — Erika J. Villaluna
(74) *Attorney, Agent, or Firm* — Klintworth & Rozenblat IP LLP

(57) ABSTRACT

A tactile sensor includes a first layer formed of flexible material having an outer contact surface and an opposed inner interface surface, a second layer formed of substantially transparent flexible material arranged in substantially continuous contact with the flexible first layer at the interface surface, a camera, and reflective material. The first and second layers are configured so that pressure exerted by an object or objects contacting the outer contact surface causes at least localized distortion of the interface surface. The camera is arranged to capture an image of the interface surface through the flexible second layer. The reflective material is configured so that the appearance of at least part of the reflective material changes as the viewing angle changes and the reflective material is located between the layers at the interface surface.

19 Claims, 4 Drawing Sheets

TACTILE SENSOR

FIELD

The invention relates to a tactile sensor, and more particularly to a tactile sensor for use in a robotic end effector such as a robotic hand.

BACKGROUND

In the field of robotics, it is often necessary to determine when an object has been contacted by an end effector or a similar device. For example, if an object is to be picked up by an end effector at the end of a robotic arm, it is important to ensure that the object is correctly located relative to the end effector, and this can be determined when the end effector makes contact with the object. Similarly, the alignment of the object with the end effector should also be determined when the end effector makes contact with the object. Such sensing is particularly important if the end effector is relatively delicate, such as a robotic hand.

A number of types of tactile sensor are already known. For example, the "TacTip" sensor, developed at Bristol Robotics Laboratory, includes a flexible curved surface, on the inner (concave) surface of which are provided a number of pins (or papillae). A camera captures an image of the inner ends of the pins. When the surface is deformed by contact with an object, the inner ends of the pins move, and this movement can be seen by the camera. However, forming the curved surface with the pins is not straightforward; 3D printing is possible, but 3D printed materials are not particularly robust. Further, a considerable depth is needed to accommodate the pins, so the sensor has a minimum size, and may not be suitable for more delicate applications.

The "GelSight" sensor, developed at MIT's Computer Science and Artificial Intelligence Laboratory, uses a block of transparent rubber with a contact surface coated with a metallic paint. When the painted surface is pressed against an object, it conforms to the shape of the object. The side of the block opposite the contact surface is illuminated by three differently-coloured lights, and imaged by a camera. The camera captures images of the deformed surface in three different colours, and uses these to determine the shape of the object.

Although this type of sensor gives a good image of the object, it does not provide a good representation of the tangential or normal forces involved in the contact, and does not allow small surface vibrations to be measured and localized. Further, since the metallic paint is exposed and contacted by the object, the sensor is vulnerable to wear. The sensor is also quite large, and again may not be suitable for more delicate applications.

SUMMARY

It is an object of the present invention to provide a tactile sensor which goes some way to overcoming the abovementioned disadvantages or which at least provides the public or industry with a useful choice.

It is a further object of the invention to provide a method of using a tactile sensor which goes some way to overcoming the abovementioned disadvantages or which at least provides the public or industry with a useful choice.

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Accordingly, in a first aspect the present invention may broadly be said to consist in a tactile sensor comprising: a first layer formed of a flexible material and having an outer contact surface and an opposed inner interface surface; a second layer formed of a substantially transparent flexible material and arranged in substantially continuous contact with the flexible first layer at the interface surface; the first and second layers further configured so that pressure exerted by an object or objects contacting the outer contact surface causes at least localised distortion of the interface surface; a camera arranged to capture an image of the interface surface through the flexible second layer; reflective material configured so that the appearance of at least part of the reflective material changes as the viewing angle changes; the reflective material located between the flexible first layer and the second layer at the interface surface. Placing the reflective material behind an outer layer means that the reflective layer will not be damaged in use by direct contact with items that are gripped or touched, and will not wear away. This increases the robustness and wear time of the sensor, and allows the use of a reflective layer formed from materials that would otherwise be vulnerable or fragile in normal use if used for direct contact with touched or gripped objects.

In an embodiment, the first layer is substantially opaque.

In an embodiment, the first layer is configured to block substantially 99% of incident light from passing through the first layer.

In an embodiment, the first layer comprises a material with a Shore hardness substantially in the range between 40 and 100.

In an embodiment, the first layer is formed substantially from silicone.

In an embodiment, the silicone comprises a silicone pastry.

In an embodiment, the first layer has a thickness of substantially 1 mm.

In an embodiment, the first layer is formed substantially from polyurethane.

In an embodiment, the first layer comprises a pair of layers, the pair of layers comprising an opaque white layer and an opaque black layer, the pair of layers arranged with the black layer outermost.

In an embodiment, the pair of layers have a combined thickness of substantially 1 mm.

In an embodiment, the tactile sensor further comprises a substantially rigid third layer, on the opposite side of the second layer to the interface surface.

In an embodiment, the third layer comprises a plastic material.

In an embodiment, the third layer comprises glass.

In an embodiment, the third layer at least partly comprises the lens of the camera.

In an embodiment, the tactile sensor further comprises a dark coating on the rear surface of the third layer.

In an embodiment, the reflective material comprises a plurality of pieces of reflective material, distributed across substantially the entirety of the interface surface.

In an embodiment, the pieces of reflective material are shiny.

In an embodiment, the pieces of reflective material are iridescent.

In an embodiment, the reflective material comprises a diffraction grating on the surface facing the camera.

In an embodiment, the reflective material is highly refractive.

In an embodiment, the pieces of reflective material and first layer are formed so that their relative size is such that the particles have a size substantially one-quarter the thickness of the first layer.

In an embodiment, the pieces of reflective material are substantially 0.3 mm across.

In an embodiment, the small pieces of reflective material are at least partly randomly distributed across the interface surface.

In an embodiment, the small pieces of reflective material are arranged in a pattern.

In an embodiment, the pattern comprises a grid.

In an embodiment, the small pieces of reflective material are each spaced approximately 0.3 mm from one another.

In an embodiment, the reflective material further comprises a pattern of thermochromatic ink.

In an embodiment, the thermochromatic ink is printed on and forms part of the interface surface.

In an embodiment, the thermochromatic ink is printed on the second layer where this abuts with the interface surface in use.

In an embodiment, the camera has a resolution of substantially 640×480 capturing at 120 frames per second.

In an embodiment, the camera has a global shutter and a monochrome image with 10 bits per pixel.

In an embodiment, the tactile sensor further comprises a light source configured to illuminate the reflective material on the side viewed by the camera.

In an embodiment, the tactile sensor further comprises a second camera, spaced apart from the first camera and arranged to capture an image of the reflective material through the flexible second layer.

In an embodiment, the first and second cameras are arranged in parallel.

In a second aspect the present invention may broadly be said to consist in a method of measuring contact using a tactile sensor as claimed in any one of the preceding statements, comprising the steps of:
i) determining the baseline position of the reflective material;
ii) bringing the sensor into contact with an item;
iii) analysing changes from the baseline position in the amount and position of light reflecting from the reflective material.

In an embodiment, in the step of analysing the light change, the amount of change over time is analysed.

In an embodiment, the analysis is carried out using a neural network.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description which is given by way of example only and with reference to the accompanying drawings which show an embodiment of the device by way of example, and in which.

DETAILED DESCRIPTION

Embodiments of the invention, and variations thereof, will now be described in detail with reference to the figures.

Sensor Structure

Figure 1:
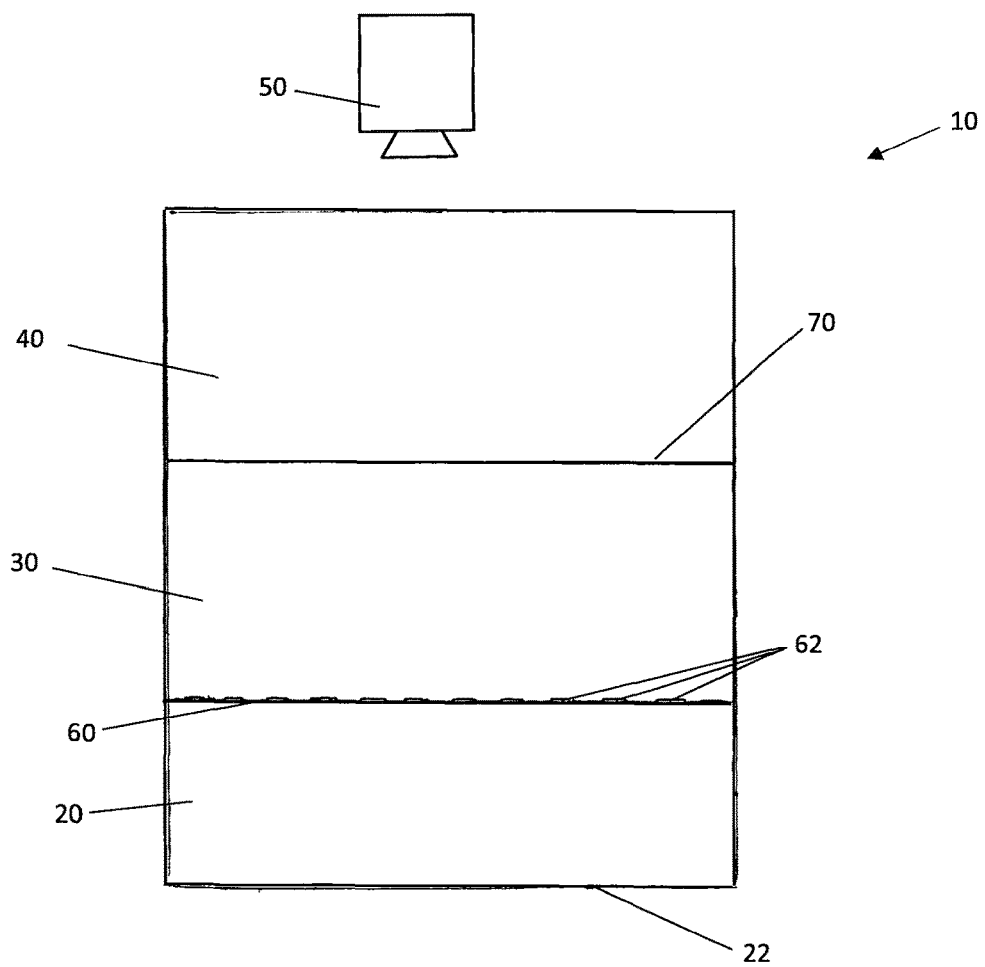
FIG. 1 shows a simplified schematic view of an embodiment of the tactile sensor of the present invention, the embodiment of tactile sensor comprising a flexible opaque outer 'skin' layer, a flexible transparent central layer, a substantially rigid transparent inner layer, a camera located behind the inner layer, and small pieces of reflective material located on the interface between the flexible opaque outer layer and the flexible transparent central layer.

FIG. 1 shows a simplified schematic cross-sectional view of the general structure of an embodiment of the tactile sensor of the present invention, to show the principles of construction and operation. The tactile sensor 10 has three main parts: a flexible opaque outer layer 20, a flexible transparent central layer 30, a substantially rigid transparent inner layer 40, and a camera 50.

The flexible opaque outer layer 20 is made from an opaque elastic material, and the flexible transparent layer 30 is made from a transparent elastic material. These two layers are in contact with each other at a first interface surface 60.

The opaque layer 20 is sufficiently opaque that changes in external lighting are not detectable by the cameras. That is, during typical operations, the change in incident light on the outside surface of the sensor should produce less than 1 bit of signal change in the cameras. For a camera that produces 8 bits per pixel, this would mean that the change in the amount of light entering the sensor in an area covered by one pixel from the outside would be less than $\frac{1}{256}$th the amount of light that a pixel would see inside the sensor. That is, substantially blocking about 99% of the light is sufficient.

In the preferred embodiment, the hardness of the skin (outer layer 20) would fall in the range 40-100 Shore A.

The skin and flesh layers (flexible opaque outer layer or skin 20, a flexible transparent central layer 30, a substantially rigid transparent inner layer) are formed from an elastomer, typically silicone or polyurethane. In the preferred embodiment, silicone is used because the skin (outer layer 20) can be made from a silicone pastry—that is, a form of silicone that is plastically deformable, highly non-elastic, and non-flowing before it is cured. In this state, the silicone skin in the mould is sticky enough to accept glitter particles, sprinkled or placed individually (see below for a detailed explanation of the glitter particles). During the cure process, the skin or outer layer 20 will bond reliably to the optically clear silicone flesh (central layer 30), and to silicone-based adhesives which are used to bond it to a metal substrate that forms part of the general structure of an end effector, robotic manipulator, or similar, of which the tactile sensor forms a part. After curing, the skin or outer layer 20 becomes elastically deformable, and robust.

The thickness of each of the layers is determined by intended use. The thinner the skin (layer 20), the greater the ability of the tactile sensor 10 to resolve small objects details. However, a thinner skin is less robust, and after many repeated contacts with objects, the skin will begin to wear thin. Once all the skin becomes worn, the cameras can 'see' light entering from the outside environment (see above), which, if there are changes in the ambient light, can cause 'false positives' (signal change in the sensor) even when nothing is being touched or gripped. Also, when the skin is worn, the underlying glitter particles can be quickly worn away. At this point, the sensor can be said to have failed. The thicker the skin, the longer it will be until the skin has worn through.

The skin layer 20 would typically be about 1%-10% of the total thickness of the elastomer layers.

The optimal overall size of the sensor 10 is dictated by the optimal size of robotic manipulators that it might be integrated into. However, manufacturing sensors that have a size below about 10 mm diameter is difficult. There is no particular upper limit to the size of the device. However, at very large sizes, inertia and gravity will have an increasingly large effect on the sensor, and may begin to overwhelm contact forces, making it difficult to distinguish if a movement of the glitter particles was caused by contact or by acceleration or reorientation of the robot.

The substantially rigid transparent inner layer 40 may be formed from any suitable material, such as glass, but is preferably made from a plastic material, for lightness and robustness. The flexible transparent layer 30 and the substantially rigid transparent layer 40 contact each other at a second interface surface 70. In variations, the transparent rigid material (layer 40) may simply be the lens of the camera, while the surrounding rigid material would be opaque.

The flexible opaque outer layer 20 has a free external surface 22 on the opposite side to the first interface surface 60. This free surface 22 is the external contact surface of the tactile sensor 10, and in use will come into contact with an object to be sensed. The elasticities of the flexible opaque outer layer 20 and the flexible transparent layer 30 are such that when the external contact surface comes into contact with an object to be sensed, the first interface surface 60 between the layers 20 and 30 will be deformed as the flexible opaque outer layer 20 and the flexible transparent central layer 30 are pressed against the substantially rigid transparent inner layer 40.

It is most preferred that at the lower end of the range of contact force, the force is just sufficient to cause just enough deformation of the skin layer, and thus rotation of one or more glitter particles, so that the cameras would be able to detect that change in brightness. The flexibility of the material of the layers, and their dimensions, will impact on this. Ideally the highest level of force that the sensor might experience during use, including from accidental impacts, would not induce enough pressure in the elastomer layers to cause permanent change. Further ideally, this level of force would not cause a particle of glitter to impact the camera lens, and thus the sensor is still able to sense changes in force even at this very high force value.

The implication of these two requirements is that the sensor has an extremely high dynamic range; able to detect very small forces, while still being able to distinguish between two slightly different but very large forces.

The outer surface of the skin is not expected to wrinkle. The material is elastic enough that it will always maintain a smooth surface.

A large number of small pieces 62 of reflective material—glitter, in this embodiment—are located at the first interface surface 60, facing the substantially rigid transparent inner layer 40. The small pieces of reflective material 62 may be shiny, iridescent, highly refractive, may have a diffraction grating on the surface observed by the camera, and/or may have a holographic pattern. These pieces 62 are generally planar, and rest on the first interface surface 60, sandwiched between the flexible opaque outer layer 20 and the flexible transparent central layer 30. The pieces 62 of reflective material may be arranged in a random manner (for example, by being sprinkled onto the interface surface 60 of the flexible layer 20), or may be in an ordered arrangement (such as a grid). Ideally, the pieces are created so that they are as small as practically possible. The smaller the pieces are, the smaller are the details that the sensor will be able to resolve.

In embodiments where these pieces are placed individually, then the lower limit on their size is the limit at which they can be reliably handled and placed.

The lower limit may also be set by the resolution of the camera. Ideally, each piece of glitter would take up several pixels on the image sensor. The space between each particle would similarly be the equivalent of several pixels wide.

The lower useful limit is set by the skin thickness (thickness of layer 20). The thickness of the skin limits its own curvature, and therefore the limit of the size of details which can be resolved by the sensor. In general, the particles should not be very much smaller than ¼ of the thickness of the skin.

Figure 5:
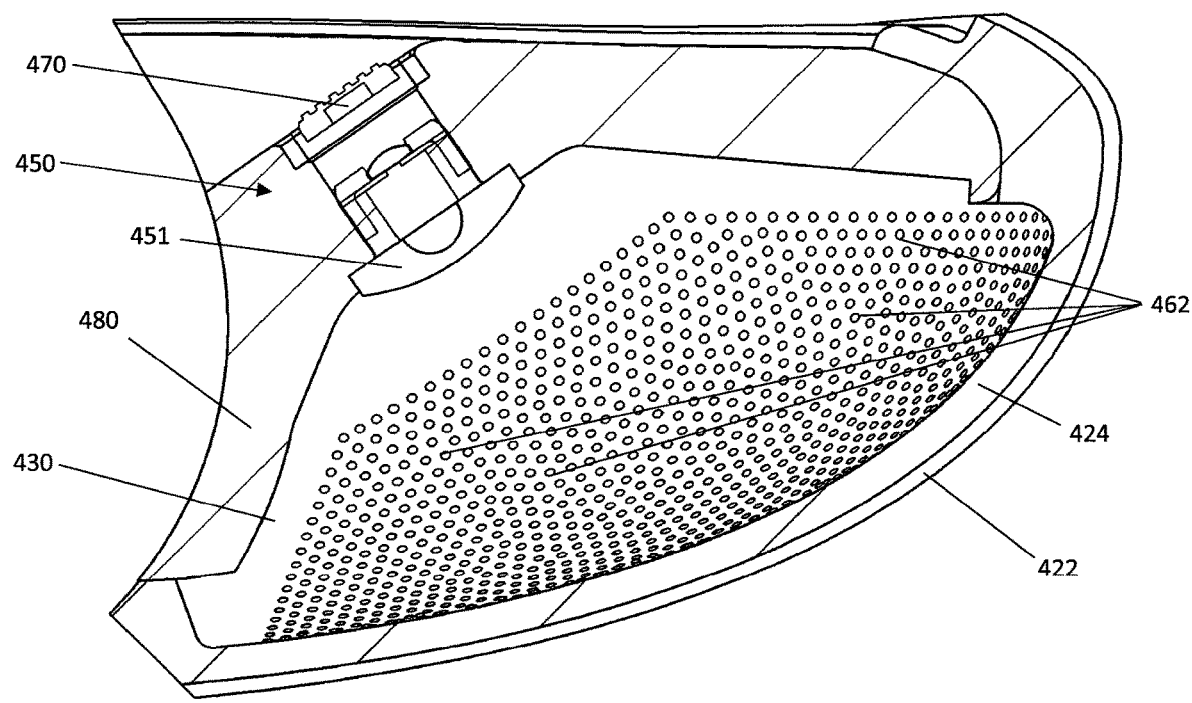
FIG. 5 shows a simplified schematic side cross-sectional view of an embodiment of the tactile sensor in use embedded in and forming part of the end joint of the finger of a robot hand.
Figure 6:
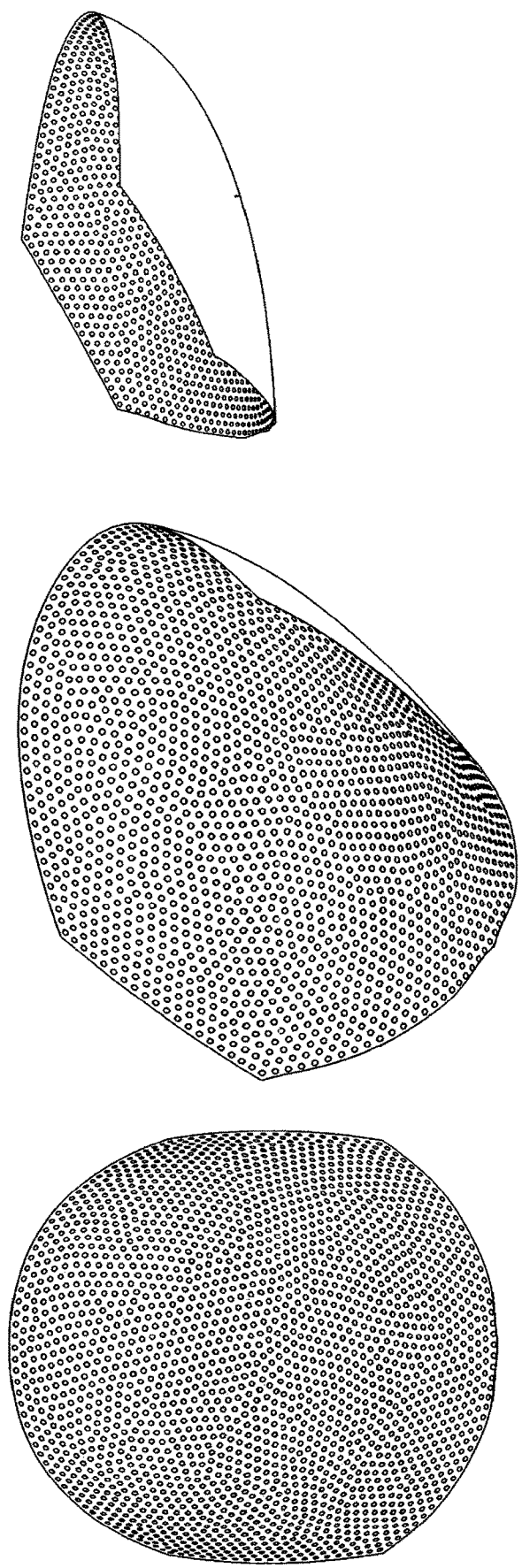
FIG. 6 shows top, side-rear-and-above perspective, and side-above-perspective views of the distribution of glitter on the inner surface of the flexible opaque inner layer in the embodiment of tactile sensor of FIG. 5, the glitter distribution generally having the same shape as the outer/lower part of a human fingertip.

In a preferred embodiment such as for example the embodiments of FIG. 5 (described in detail below), the particles are 0.3 mm in diameter, spaced 0.3 mm apart, and the skin (layer 20) is 1 mm thick.

The camera 50 faces the rear surface of the substantially rigid transparent layer 40 (that is, the surface of layer 40 opposite to the second interface surface 70). The camera 50 captures an image of the first interface surface 60 between the flexible opaque outer skin layer 20 and the flexible transparent layer 30, including the small pieces 62 of reflective material. One or more light sources (not shown) are provided to illuminate the first interface surface 60 of the flexible opaque layer 20 and the small pieces 62 of reflective material through the substantially rigid transparent layer 40 and the flexible transparent inner layer 30, to allow a brightly-lit image to be captured. The image is transmitted away from the tactile sensor 10 for analysis.

Ideally, the camera 50 is of the type designed for machine vision applications, and has global shutter and high frame rate. A colour image is not necessary in this application, but a high bit depth per pixel is useful to be able to detect small changes in the intensity of light from the glitter particles. If a thermochromic pigment is mixed into the skin layer, then a colour camera is useful.

In this embodiment, the camera/image sensor 50 has a resolution of 640×480 capturing at 120 frames per second. The camera/image sensor 50 further has a global shutter and a monochrome image with 10 bits per pixel. The distance between the camera and the skin surface is chosen so that the camera's field of view covers the area of skin that needs to be sensitive, and so that the glitter particles are generally in focus.

The flexible opaque outer layer 20, the flexible transparent layer 30 and the substantially rigid transparent inner layer 40 are all generally laminar, with generally smooth surfaces. In FIG. 1, the surfaces are shown as flat, but the shape of the surface can vary depending on the installation requirements of the sensor. For example, if the sensor is to be positioned in the tip of a finger of a robotic hand, the surfaces will be curved to correspond to the curvature of the fingertip. The embodiment shown in FIG. 4 has this arrangement. This embodiment is discussed in more detail below.

Accordingly, the interface surfaces 60 and 70, and in particular the first interface surface 60, will also be generally smooth when the flexible opaque outer layer 20 and the flexible transparent layer 30 are not deformed. As a result, the small pieces 62 of reflective material are normally arranged so that they are flat on the interface surface 60, and will reflect a certain amount of light from the light source into the camera 50. The image captured by the camera 50, and in particular the reflections from the small pieces 62 of reflective material, when the tactile sensor 10 is in this state, corresponds to a state where the contact surface of the tactile sensor 10 is not in contact with anything.

As mentioned above, when the contact surface comes into contact with an object to be sensed, the first interface surface 60 will be deformed. During this deformation, the inclination of some of the small pieces 62 of reflective material relative to the substantially rigid transparent layer 40 will change, and as a result, the amount of light reflected back to the camera by these pieces 62 of reflective material will also change. This is shown in an exaggerated manner in the embodiment of FIG. 4, which shows schematically the change in the orientation of the reflective pieces, which will cause the change in the angle and therefore the amount of the reflected light received by the camera or cameras. Thus, the image captured by the camera 50 will change when an object such as for example the object 80 shown in FIG. 4 comes into contact with the contact surface. If the reflective material pieces 62 have a holographic pattern, then the colour of light reflected will also change as the angle of inclination changes, which can assist with improving the sensitivity of the sensor.

As mentioned above, the image captured by the camera or cameras 50 is analysed. In particular, any changes from the image captured when the first interface surface 60 is in its undeformed state (that is, when the contact surface of the tactile sensor 10 is not in contact with an object) will indicate that an object has come into contact with the contact surface of the tactile sensor 10.

There are many ways to analyse the image data. Preferred methods are discussed in detail in the 'analysis' section below.

Figure 2:
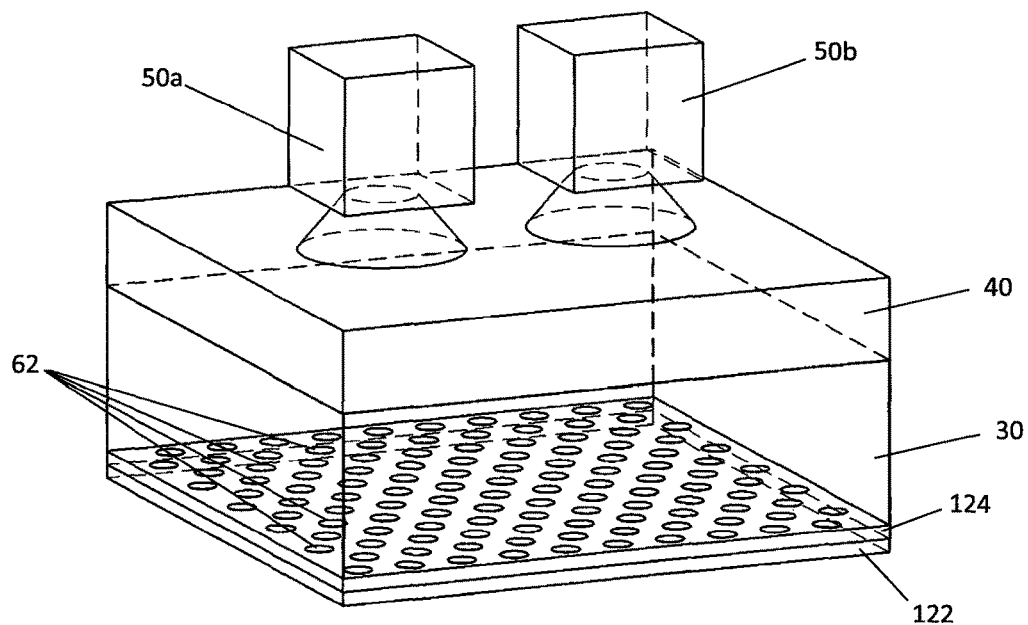
FIG. 2 shows a simplified perspective schematic view of an embodiment of the tactile sensor of the present invention, the sensor of this embodiment using dual cameras and having a flexible transparent central layer, a substantially rigid transparent inner layer, and a dual-layer outer skin formed from two firm opaque layers, with small pieces of reflective material located on the interface between the inner surface of the outer skin layers between the skin layers and the flexible transparent central layer, the cameras located behind and looking through the rigid transparent inner layer.
Figure 3A:
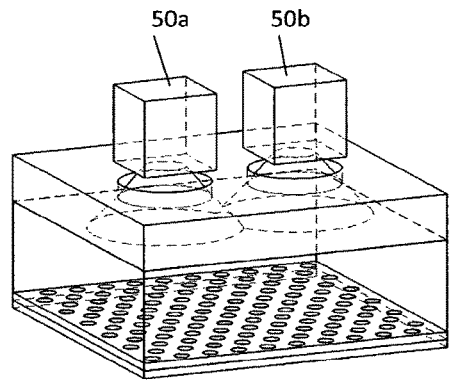
FIG. 3a shows a variation of the embodiment of FIG. 2, with holes formed in the rigid or firm inner layer, the cameras positioned within and looking through the holes.
Figure 3B:
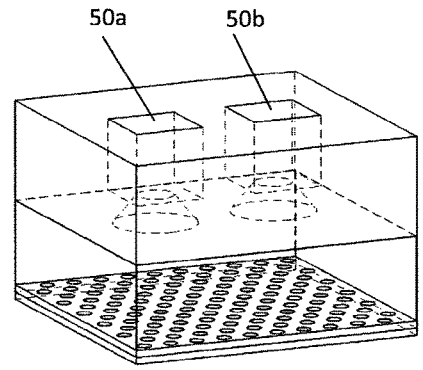
FIG. 3b shows a variation of the embodiment of FIGS. 2 and 3a, with the cameras embedded within the rigid/firm layer, the lenses positioned at the interface between the rigid/firm layer and the flexible transparent central layer.
Figure 4:
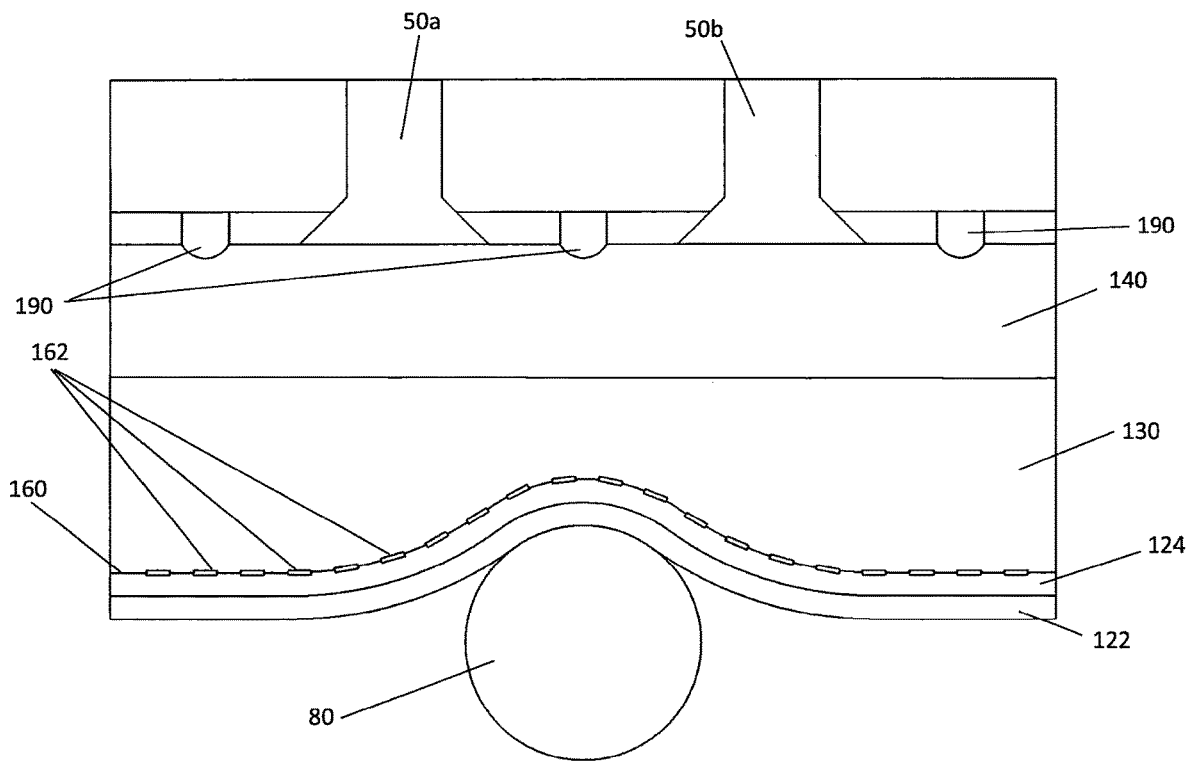
FIG. 4 shows a simplified schematic side cross-sectional view of the multi-camera embodiment of a variation of the tactile sensor of FIG. 2 in operation, with the outer surface of the outer layer making contact with an object and deforming, LED light sources positioned at the rear of the firm layer beside/between the cameras to provide a light source for the cameras and reflective pieces.

A single camera 50 can be used to image the pieces 62 of reflective material, as in the embodiment shown in FIG. 1. However, in variations or embodiments two or more spatially separate cameras can be used, to obtain stereo images of the first interface surface 60 and the pieces 62 of reflective material. An arrangement using two cameras 50*a* and 50*b* is shown in the embodiments of FIGS. 2, 3 and 4, and discussed in detail below. A 3-D image of the part of the object in contact with the contact surface can be derived from this stereo image. The camera or cameras can also be positioned with their lenses located at different positions within the layers, as shown in the variations of FIGS. 3*a* and 3*b*, where the camera or cameras are positioned within and looking through holes formed in the rigid or firm inner layer (FIG. 3*a*), or where the camera or cameras are embedded within the rigid/firm layer, the lenses positioned at the interface between the rigid/firm layer and the flexible transparent central layer.

For embodiments with multiple cameras, the distance between the cameras can be chosen according to the needs of the sensing application. The further apart the cameras are spaced, the greater the certainty in triangulating the positions of the glitter particles, but the less perfect is the overlap of the fields of view. There will always be some volumes within the sensor which can be seen by both cameras, some which can be seen by one of the two cameras, and some which cannot be seen. Particles within the volume covered by the field of view of both cameras can have their position in space triangulated with good certainty. Therefore, the greater the separation, the fewer particles can be triangulated.

Positioning the cameras parallel to each other has the advantage that two image sensors can be placed on the same printed circuit board, and their signals can be aggregated locally. However, this configuration gives less overlap of the images than if the cameras were oriented towards each other.

Orientating the cameras away from each other gives more total coverage of the inside surface of the skin, at the expense of less overlap of the two images.

As well as determining when the contact surface of the tactile sensor 10 has come into contact with an object, the tactile sensor 10 can be configured to provide further information. For example, the tactile sensor 10 can be arranged to sense the temperature of its surroundings, through the use of thermochromic inks, which change their colour depending on their temperature.

In this variation, a pattern is printed in thermochromic ink on the surface of the flexible opaque outer layer 20 which faces inwards towards the flexible transparent layer 30. The pattern may also (or instead) be printed on the surface of the flexible transparent layer 30 which faces outwards towards the flexible opaque layer 20, as long as this does not obscure the pieces 62 of reflective material and prevent them from being imaged sufficiently by the camera 50. The colour of this pattern will change depending on the temperature of the ink, which will in turn be related to the temperature of the tactile sensor 10. As long as the camera 50 is capable of capturing a colour image, then the colour of the pattern (and thus the temperature of the tactile sensor 10) can be detected.

This ink can be printed in a specific pattern, or simply printed without a specific pattern. The entire surface of the skin may be thermochromic. In embodiments where there is a pattern, it does not matter what specific pattern is chosen. As long as the machine vision application can distinguish between the glitter particles and the background, then the contrast between thermochromic areas and non-thermochromic areas gives the temperature signal. The entire surface of the flexible opaque outer layer 20 which faces the flexible transparent layer 30 can be coated with thermochromic ink, and the pieces 62 of reflective material rest on the thermochromic ink. This allows temperature gradients across the tactile sensor to be sensed. An example of a suitable thermochromic ink that can be used is the 'colour to clear' pigment produced by MESGO Iride Colors.

FIGS. 2 and 4 shows a cross-sectional schematic view of an embodiment of the sensor, numbered as sensor 110 on FIG. 2. In this embodiment, the layers are shown approximately to scale, but it will be appreciated that changes to the relative sizes can be made depending on how and where the sensor 110 is to be used. Further, it can be seen that rather than a single-layer flexible opaque outer layer 20, as in the embodiment of FIG. 1, the embodiment of sensor 110 of FIG. 3 includes a dual-layer outer skin or 'first layer', formed from a firm opaque white layer 124 and an outermost firm opaque black layer 122, the layers 122 and 124 in combination forming the 'first layer'. Small pieces 162 of reflective material are sandwiched between the firm opaque white layer 124 and a soft transparent layer 130 (which corresponds to the flexible transparent layer 30 of the sensor 10 of FIG. 1).

The firm layers 122, 124 together form the outermost layer of the sensor 110, and act as an analogue to skin, with the firm opaque black layer 122 outermost, and acting as the contact surface of the sensor (analogous to the epidermis). Suitable materials from which the firm layers 122, 124 may be formed include silicone and polyurethane.

The firm opaque black layer 122 is formed from a hard-wearing material, to improve the life of the sensor. Any material having similar properties to human skin (or at least human epidermis) is suitable. However, in particular it is important that this layer should not be sticky—the material is chosen and/or treated to control the amount of grip or slip. The firm opaque black layer 122 also serves to block out external light, so that the inside of the sensor 110 remains optically consistent. The silicone material discussed above is suitable for this use.

The firm opaque white layer 124 also helps to block out external light, and provides a plain white background against which the small pieces 162 of reflective material can be imaged more easily. In addition, the firm opaque white layer 124 can in embodiments contain a thermochromic dye, allowing the sensor to measure the temperature of objects. Further, the sensor can be actively warmed by a heating element or heating mechanism (not shown), which would allow the sensor to detect thermal conductivity in objects in a similar manner as humans do.

The firm layers 122, 124 are relatively thin in comparison to the flexible transparent layer 130 and the substantially rigid transparent layer 140. In one particular embodiment, the firm layers 122, 124 have a combined thickness of around 1 mm, the flexible transparent layer 130 has a thickness of around 5 mm, and the substantially rigid transparent layer 140 has a thickness of around 3 mm, but the thicknesses can of course be varied depending on circumstances.

Furthermore, the flexible transparent layer 130 is very soft relative to the firm layers 122, 124. Thus, this layer 130 corresponds to the subcutaneous layer or hypodermis, and allows the firm layers 122, 124 to move when forces are applied to the tactile surface of the sensor 110. The flexible transparent layer 130 is optically clear and colourless, so that the small pieces 162 of reflective material can be imaged. As with the firm layers 122, 124, the flexible transparent layer 130 may be formed from silicone or polyurethane.

The same as for the embodiment of FIG. 1, the principal purpose of the flexible transparent layer 130 is to space the small pieces of reflective material 162 from the substantially rigid transparent layer 140; if the small pieces of reflective material 162 are in contact with the substantially rigid transparent layer 140, then they will not be able to move when an object came into contact with the sensor 110, and the sensor 110 will not function. In variations of this embodiment, a clear liquid can be used to separate the firm layers 122, 124 (and so the small pieces 162 of reflective material) from the substantially rigid transparent layer 140. In other embodiments, an air gap can be used to separate the firm layers 122, 124 and the substantially rigid transparent layer 140.

The spacing is chosen according to the needs of the sensor. In a preferred embodiment, the thickness of the soft transparent layer is approximately 15 mm.

The principal purpose of the flexible transparent layer 130 is to translate forces at the interface surface into movement of the small pieces 162 of reflective material. Ideally, the flexible transparent layer 130 should be as thick as possible within the physical constraints of the sensor. A thicker layer gives more movement of the small pieces 162 of reflective material for the same amount of force applied to the outer surface.

The rigid transparent layer 140 allows the sensor 110 to be mechanically connected to whatever form of end effector it is to be used on (such as a finger of a robotic hand, as in the embodiment shown in FIG. 4). The layer 140 also accommodates and protect the cameras 150, light sources 190, associated electronics, and the like.

Behind the substantially rigid transparent layer 140 are located two cameras 150 and a plurality of light sources 190 (in the embodiment shown in FIG. 4, there are three light sources 190. For clarity, these are not shown on FIG. 2). The regions between the cameras 150 and light sources 190 are dark, which is achieved by placing a dark coating 200 on the rear surface of the substantially rigid transparent layer 140.

The brightness of the light sources is chosen to be bright enough to be substantially brighter than any light leaking in through the opaque skin, while not overwhelming the sensitivity of the image sensors.

The small pieces 162 of reflective material provide for tactile sensing in two principal ways. Firstly, as they act as mirrors, they are optically very sensitive to small changes in angle. The cameras 150 can 'see' the light sources 190 reflected in the small pieces 162 of reflective material. A small change in the angle of a piece 162 of reflective material dramatically changes the amount of light reflected back into the cameras 150, changing from dim to bright, or vice versa, so that the pieces 162 of reflective material will 'sparkle' or, from any fixed position (e.g. the camera position) they will appear to produce flashes of light as their position changes. Since there are two cameras 150, and because in any given area under motion multiple pieces 162 of reflective material will be affected, there are in use multiple movements of the pieces of reflective material 162, and multiple sparkles. This feature makes the design extremely sensitive to small forces.

Secondly, as the small pieces 162 of reflective material contrast well against the white background 124, and have a clear space between them, the small pieces 162 of reflective material are easy to track in the camera images using computer vision software. Using two cameras 150, the exact position of each particle in 3D space can be triangulated. In this way, the geometry of the inside surface of the firm layers 122, 124 (the skin) can be re-created inside the computer. This geometry can then be used to recreate the shape of any object pressing into the skin surface, in that it is possible to feel the difference between a flat surface, a lump, an edge, a point, or multiple points.

Further, careful design of the light sources 190 can optimise the amount of sparkle, and therefore the sensitivity of the skin of the sensor 110 to small forces. A combination of several light sources 190 with dark areas 200 between them creates a greater amount of sparkle than a single small or large light source, and it is for this reason that the regions between the cameras 150 and light sources 190 are dark.

The design (type and position) of the light sources can affect the amount of sparkle, and thus the sensitivity of the sensor to very small forces. For all embodiments, the aim of the design of the light sources is to minimise the movement that the small pieces of reflective material need to make before that movement is detected by the image sensors. Ideally, the cameras should see one of the small light sources reflected in the glitter particle. When the particle rotates slightly due to a force being applied at the interface surface, the camera will no longer see the reflected light, and so the particle seems to suddenly dim. If the light source is larger, then the particle will have to rotate further before the light source can no longer be seen by the camera. If the light source is small, then the particle need only rotate a small way before the light source is no longer visible. Therefore, small light sources provide more sparkle, and make the sensor more sensitive to small forces.

As noted above, FIGS. 1 to 4 show simplified schematic views, in order to best illustrate the principles behind the tactile sensor of the present invention. FIG. 5 shows an embodiment of the tactile sensor in use with the finger of a robot hand. This embodiment of sensor 410 is bonded to a metal substrate 480 that forms a frame or skeleton for the sensor 410, the sensor 410 being roughly analogous to a fingertip on the end of a finger, and approximately the same size as an outer finger joint.

The skin of the sensor 410 in this embodiment is formed from two layers, a firm opaque white layer 424 and a firm opaque outermost black layer 422, similar to the two layers of the embodiment of FIG. 3 described above. The firm layers 422, 424 form the outermost layer of the sensor 410, and act as an analogue to skin, with the firm opaque black layer 422 acting as the contact surface of the sensor (analogous to the epidermis). Suitable materials from which the firm layers 422, 424 may be formed include silicone and polyurethane. The combined thickness of the layers 422, 424 is approximately 1 mm.

The firm opaque black layer 122 is formed from a hard-wearing material, to improve the life of the sensor. Any material having similar properties to human skin (or at least human epidermis) is suitable. However, in particular it is important that this layer should not be sticky—the material is chosen and/or treated to control the amount of grip or slip. The firm opaque black layer 122 also serves to block out external light, so that the inside of the sensor 110 remains optically consistent. The silicone material discussed above is suitable for this use.

A soft transparent layer 430 is located behind the opaque white layer 424. The layer 430 fills most of the space in the 'fingertip', between the inner surface of the layer 424, and the metal substrate 480. As for the previous embodiments, the layer 430 is very soft relative to the firm layers 422 and 424.

A layer of small pieces of reflective material 462 is sandwiched between the firm opaque white layer 424 and a soft transparent layer 430. The pieces are spread over the inner surface of layer 424 substantially evenly. As shown in FIG. 5, the general shape of these surfaces is a curved 'scoop' that generally has the shape of the outer/lower part of a human fingertip.

An image sensor assembly or camera 450 is located at approximately the equivalent position as a fingernail would be in a human hand. The sensor has a lens 451 at the 'base' of the fingernail, that is aligned to point outwards and forward diagonally from the 'base', towards the skin formed by layers 422 and 424, these layers curving around the field of view of the lens 451 as shown in FIG. 5. An image sensor unit 470 is located at the rear of the sensor assembly/camera 450, hard-connected to a remotely-located image processor (not shown). Ideally, the camera 450 is of the type designed for machine vision applications, and has global shutter and high frame rate. A colour image is not necessary in this application, but a high bit depth per pixel is useful to be able to detect small changes in the intensity of light from the glitter particles. If a thermochromic pigment is mixed into the skin layer, then a colour camera is useful. In this embodiment, the camera/image sensor 450 has a resolution of 640×480 capturing at 120 frames per second. The camera/image sensor 450 further has a global shutter and a monochrome image with 10 bits per pixel. The distance between the camera and the skin surface is chosen so that the camera's field of view covers the area of skin that needs to be sensitive, and so that the glitter particles are generally in focus.

The operation of the sensor 410 is the same or similar to the embodiments described above: The camera 450 captures an image of the rear surface of layer 424, on which the glitter 462 is distributed. One or more light sources (not shown) are provided to illuminate this surface and the small reflective pieces of glitter 462, to allow a brightly-lit image to be captured. The image is captured by the image sensor unit 470 and transmitted for analysis. This initial image corresponds to a neutral position, where nothing is being touched or held.

As mentioned above, when the contact surface—that is, the outer surface of layer 422—comes into contact with an object to be sensed, the layers 424 and 422 are deformed away from their neutral position. During this deformation, the inclination of some of the small pieces of reflective material 462 will change, and as a result, the amount of light reflected back to the camera 450 by these pieces will also change, and the image captured by the camera 450 will change. The new (deformation) image captured by the camera 50 is analysed. In particular, any changes between the 'neutral' or 'undeformed' image and the 'deformed' image. Analysis of these changes shows the shape of the object and how much 'grip' force is being applied, as outlined in the analysis section below.

The embodiments of tactile sensor described above are described in the context of use on a robotic end effector; however, it will be appreciated that the tactile sensor is not limited to this, and can be used in other situations, such as for example Game controllers, Virtual reality interfaces, other parts of the robot.

Analysis

As outlined above, the movement of the glitter particles when the outer skin or surface of the sensor is deflected is detected by the camera. The position and movement of each glitter particle detected in the camera image can be tracked and calculated by using a suitable machine vision algorithm. This is made easier by the fact that:

a) the glitter particles have a good contrast against the plain white background.
b) the glitter particles will likely not change position by much each frame.
c) the glitter particles form a consistent pattern.

Firstly, the baseline positions (in a neutral or un-deformed state) of the particles are established.

Next, the particle positions must be correlated between the two cameras.

Next, the three-dimensional position of the glitter particle can triangulated.

Once this is done for all particles, a 3D mesh can be constructed from the point cloud of glitter particles, which represents the shape of the inside surface of the skin. This can be offset by the thickness of the skin to create a representation of the outside surface of the skin. This information can be used to extract information about the object under contact.

Alternatively, the raw image stream can be fed into a neural network which is learning to analyse the data. The network learns to correlate changes in the image with feedback from other sensors to make sense of the data.

The shape and size of a gripped object (at least, the shape and size of the part which is in contact with the contact surface) can be determined from analysing which of the reflective material pieces (e.g. pieces 62) are reflecting a different amount of light from the established baseline amount. Further, as the interface surface (e.g. surface 60) is deformed by the contact with the object, some of the pieces of reflective material will move relative to the camera, and this movement can be detected and analysed. It is this movement of the pieces reflective material which gives an indication of the surface forces involved in the contact.

Furthermore, motion of the object relative to the contact surface can be determined by tracking changes in the amount of light reflected by the pieces of reflective material over time. These changes may be static relative to the pieces of reflective material; that is, if the amount of light reflected by a particular piece of reflective material changes over time, then this indicates that the amount of local deformation, and thus the contact pressure of the object, is changing over time. The local deformation may also move the pieces of reflective material, as mentioned above, and this motion can be detected and analysed for further information. This information can be useful when a gripper is picking up or setting down an object, as the tactile sensor can determine how firmly the object is being gripped.

Alternatively, or additionally, these changes may be dynamic relative to the pieces of reflective material. For example, if an object is dragged along the contact surface, the area of changed reflective characteristics in the image will also move, and this allows the location of the point of contact of the object with the contact surface to be tracked in real time.

The invention claimed is:

1. A tactile sensor comprising:
a first layer formed of a flexible material and having an outer contact surface and an opposed inner interface surface, the first layer comprising a pair of layers, the pair of layers comprising an opaque white layer and an opaque black layer, the pair of layers arranged with the black layer outermost;
a second layer formed of a substantially transparent flexible material and arranged in substantially continuous contact with the flexible first layer at the interface surface;
the first and second layers further configured so that pressure exerted by an object or objects contacting the outer contact surface causes at least localized distortion of the interface surface;
at least one camera arranged to capture an image of the interface surface through the flexible second layer; and
reflective material configured so that an appearance of at least part of the reflective material changes as an angle of viewing changes, and the reflective material being located between the flexible first layer and the second layer at the interface surface.

2. The tactile sensor as claimed in claim 1, wherein the first layer is configured to block substantially 99% of incident light from passing through the first layer.

3. The tactile sensor as claimed in claim 1, wherein the first layer comprises a material with a Shore hardness substantially in the range between 40 and 100.

4. The tactile sensor as claimed in claim 1, further comprising a substantially rigid third layer, on the opposite side of the second layer to the interface surface.

5. The tactile sensor as claimed in claim 4, wherein the third layer at least partly comprises a lens of the camera.

6. The tactile sensor as claimed in claim 4, further comprising a dark coating on a rear surface of the third layer.

7. The tactile sensor as claimed in claim 1, wherein the reflective material comprises a plurality of pieces of reflective material, distributed across substantially an entirety of the interface surface.

8. The tactile sensor as claimed in claim 7, wherein the reflective material comprises a diffraction grating on the surface facing the camera.

9. The tactile sensor as claimed in claim 7, wherein the pieces of reflective material and first layer are formed so that their relative size is such that particles thereof have a size substantially one-quarter of a thickness of the first layer.

10. The tactile sensor as claimed in claim 7, wherein the pieces of reflective material are substantially 0.3 mm across.

11. The tactile sensor as claimed in claim 7, wherein the pieces of reflective material are arranged in a pattern.

12. The tactile sensor as claimed in claim 11, wherein the pattern comprises a grid.

13. The tactile sensor as claimed in claim 11, wherein the pieces of reflective material are each spaced approximately 0.3 mm from one another.

14. The tactile sensor as claimed in claim 1, wherein the reflective material further comprises a pattern of thermochromatic ink.

15. The tactile sensor as claimed in claim 1, further comprising a light source configured to illuminate the reflective material on a side viewed by the camera.

16. The tactile sensor as claimed in claim 1, wherein the camera is a first camera, and further comprising a second camera spaced apart from the first camera and arranged to capture an image of the reflective material through the flexible second layer.

17. A method of measuring contact using a tactile sensor as claimed in claim 1, comprising:
   i) determining a baseline position of the reflective material;
   ii) bringing the sensor into contact with an item; and
   iii) analyzing changes from the baseline position in the amount and position of light reflecting from the reflective material.

18. The method of measuring contact as claimed in claim 17, wherein in analyzing the light change, an amount of change over time is analyzed.

19. The method of measuring contact as claimed in claim 17, wherein an analysis is carried out using a neural network.

* * * * *